(12) United States Patent
Otsuki et al.

(10) Patent No.: US 9,391,346 B2
(45) Date of Patent: Jul. 12, 2016

(54) NON-AQUEOUS ELECTROLYTE ADDITIVE, NON-AQUEOUS ELECTROLYTE, AND NON-AQUEOUS ELECTROLYTE SECONDARY BATTERY

(75) Inventors: Masashi Otsuki, Koganei (JP); Hirokazu Satou, Fujisawa (JP); Shoichi Tsujioka, Miyoshi-machi (JP); Aiichiro Fujiwara, Ube (JP)

(73) Assignees: BRIDGESTONE CORPORATION, Tokyo (JP); CENTRAL GLASS COMPANY, LIMITED, Ube-shi, Yamaguchi (JP)

(*) Notice: Subject to any disclaimer, the term of this patent is extended or adjusted under 35 U.S.C. 154(b) by 149 days.

(21) Appl. No.: 14/002,772

(22) PCT Filed: Mar. 1, 2012

(86) PCT No.: PCT/JP2012/001425
§ 371 (c)(1),
(2), (4) Date: Sep. 26, 2013

(87) PCT Pub. No.: WO2012/120847
PCT Pub. Date: Sep. 13, 2012

(65) Prior Publication Data
US 2014/0017573 A1    Jan. 16, 2014

(30) Foreign Application Priority Data
Mar. 4, 2011    (JP) .................. 2011-048148

(51) Int. Cl.
*H01M 10/0567* (2010.01)
*H01M 10/052* (2010.01)
*H01M 10/0568* (2010.01)
*H01M 10/0569* (2010.01)

(52) U.S. Cl.
CPC ........ *H01M 10/0567* (2013.01); *H01M 10/052* (2013.01); *H01M 10/0568* (2013.01); *H01M 10/0569* (2013.01); *Y02E 60/122* (2013.01)

(58) Field of Classification Search
None
See application file for complete search history.

(56) References Cited

U.S. PATENT DOCUMENTS

2003/0170548 A1* 9/2003 Otsuki et al. .................. 429/326

FOREIGN PATENT DOCUMENTS

| CN | 1471743 A | 1/2004 |
|---|---|---|
| CN | 1732580 A | 2/2006 |
| CN | 1906796 A | 1/2007 |
| CN | 101587971 A | 11/2009 |
| EP | 2166611 A1 | 3/2010 |
| JP | 2001-052736 A | 2/2001 |
| JP | 2009-129541 A | 6/2009 |
| JP | 2010-015719 A | 1/2010 |
| KR | 10-2010-0015616 A | 2/2010 |
| WO | 02/21629 A1 | 3/2002 |
| WO | 2012005945 A1 | 1/2012 |

OTHER PUBLICATIONS machine translation of JP 2001-052736, retrieved from <https://www.j-platpat.inpit.go.jp/web/all/top/BTmTopEnglishPage> on May 5, 2015.*
Horn (Synthesis and properties of some cyclotriphosphazene derivatives, Chemiker-Zeitung (1981), 105 (7-8), 213-216).*
First Office Action issued Feb. 5, 2015 in corresponding Chinese Patent Application No. 201280011594.5 with translation.
Communication from the European Patent Office issued Jul. 18, 2014 in counterpart European Application No. 12755645.4.
Communication from Korean Patent Office issued Sep. 24, 2014 in counterpart Korean Patent Application No. 10-2013-7023444.
Notification of Reasons for Refusal issued Nov. 11, 2014 in corresponding Japanese Patent Application No. 2011-048148 with translation.
Communication dated Sep. 23, 2015 from the State Intellectual Property Office of the People's Republic of China in counterpart Application No. 201280011594.5.

* cited by examiner

*Primary Examiner* — Cynthia K Walls
(74) *Attorney, Agent, or Firm* — Sughrue Mion, PLLC

(57) ABSTRACT

The present invention relates to a non-aqueous electrolyte additive that allows for improved safety and battery characteristics of a non-aqueous electrolyte secondary battery, and in greater detail, the present invention relates to a non-aqueous electrolyte additive that includes a phosphazene compound represented by the following general formula (1):

$$(NPR_2)_n \qquad (1)$$

wherein each R independently represents fluorine or a secondary or tertiary branched alkoxy group substituted with fluorine, at least one of the Rs represents the secondary or tertiary branched alkoxy group substituted with fluorine, and n is from 3 to 14.

6 Claims, No Drawings

NON-AQUEOUS ELECTROLYTE ADDITIVE, NON-AQUEOUS ELECTROLYTE, AND NON-AQUEOUS ELECTROLYTE SECONDARY BATTERY

CROSS REFERENCE TO RELATED APPLICATIONS

This application is a National Stage of International Application No. PCT/JP2012/001425 filed Mar. 1, 2012, claiming priority based on Japanese Patent Application No. 2011-048148 filed Mar. 4, 2011, the contents of all of which are incorporated herein by reference in their entirety.

TECHNICAL FIELD

The present invention relates to a non-aqueous electrolyte additive, a non-aqueous electrolyte including the additive, and a non-aqueous electrolyte secondary battery provided with the same. More particularly, the present invention relates to a non-aqueous electrolyte secondary battery with excellent safety and battery characteristics.

BACKGROUND ART

Conventionally, mainly nickel-cadmium batteries have been used as secondary batteries for memory-backup of AV and information devices, such as personal computers, VTRs, and the like, or as power sources for driving these devices. Because of their high voltage/energy concentration and excellent self-discharge characteristics, non-aqueous electrolyte secondary batteries have particularly been attracting attention as a replacement for nickel-cadmium batteries. As a result of various development efforts, some non-aqueous electrolyte secondary batteries have already been commercialized. Currently, more than half of notebook computers, cellular phones, and the like are driven by non-aqueous electrolyte secondary batteries, and there are high expectations for their use in the near future in environmental vehicles, of which electrical vehicles and hybrid vehicles are representative.

Carbon is often used as a negative electrode material in these non-aqueous electrolyte secondary batteries, and various organic solvents are used in the electrolytes in order to mitigate the risk when lithium is produced on the surface of the negative electrode, as well as to achieve a high driving voltage. Particularly in non-aqueous electrolyte secondary batteries for cameras, alkali metals (especially lithium metals or lithium alloys) and the like are used as the negative electrode material, and aprotic organic solvents such as ester organic solvents are normally used in the electrolytes.

As described above, non-aqueous electrolyte secondary batteries exhibit high performance but cannot be considered to exhibit sufficient safety. First, alkali metals (especially lithium metals, lithium alloys, and the like) that are used as negative electrode material for non-aqueous electrolyte secondary batteries have extremely high activity with respect to water. Therefore, when for example water enters through an imperfect seal in the battery, the negative electrode material and the water react yielding hydrogen, which poses the risk of ignition or the like. Furthermore, since lithium metal has a low melting point (about 170° C.), an extremely dangerous situation may occur, such as the battery melting when a large current suddenly flows during a short circuit or the like, causing the battery to heat excessively. Moreover, the danger exists of the battery exploding or igniting due to gas that is generated upon the electrolytes evaporating or decomposing due to generation of heat in the battery. It has also been pointed out that the battery may be contaminated by minute scrap metal at the time of electrode composition, leading to a short circuit, abnormal heat generation, or ignition.

In order to solve the aforementioned problems, when temperature increases and pressure inside the battery rises during a short circuit or overcharge of a cylindrical battery, for example, a technique has been proposed to provide a mechanism in the battery whereby an excessive current of a predetermined amount or greater is prevented from flowing into the cylindrical battery by breaking electrode terminals at the same time as when a safety valve operates (see NPL 1). The mechanism does not necessarily operate normally, however, and when the mechanism does not operate normally, more heat is generated due to the excessive current, and thus the danger of ignition or the like still remains. Therefore, there is demand for the development of a non-aqueous electrolyte secondary battery that fundamentally reduces the risk of electrolyte evaporation or decomposition, ignition, and the like without relying upon a safety mechanism such as a safety valve.

A non-aqueous electrolyte secondary battery that greatly reduces the danger of the battery igniting and burning in an emergency, such as a short circuit, has thus been developed by adding a phosphazene compound to the non-aqueous electrolyte to make the non-aqueous electrolyte incombustible, flame retardant, or self-extinguishing (see PTL 1).

CITATION LIST

Patent Literature

PTL 1: WO 02/021629A1

Non-Patent Literature

NPL 1: Nikkan Kogyo Shinbun, "Electronic Technology", Vol. 39, No. 9, 1997

SUMMARY OF INVENTION

Technical Problem

In recent years, however, there has been demand for further improvement in the safety and battery characteristics of non-aqueous electrolyte secondary batteries, and the non-aqueous electrolyte secondary battery disclosed in PTL 1 now has room for further improvement. Therefore, it is an object of the present invention to provide a non-aqueous electrolyte additive that can improve the safety and battery characteristics of a non-aqueous electrolyte secondary battery, as well as a non-aqueous electrolyte including the additive and a non-aqueous electrolyte secondary battery provided with the same.

Solution to Problem

As a result of intensive study in order to achieve the above object, the inventors discovered that the safety and battery characteristics of a non-aqueous electrolyte secondary battery are greatly improved by adding, to the non-aqueous electrolyte in the non-aqueous electrolyte secondary battery, a phosphazene compound with a molecular structure that includes a secondary or tertiary branched alkoxy group substituted with fluorine, thereby completing the present invention.

Namely, the non-aqueous electrolyte additive according to the present invention includes a phosphazene compound represented by the following general formula (1):

$$(NPR_2)_n \quad (1)$$

wherein each R independently represents fluorine or a secondary or tertiary branched alkoxy group substituted with fluorine, at least one of the Rs represents the secondary or tertiary branched alkoxy group substituted with fluorine, and n is from 3 to 14.

In a preferred example of the non-aqueous electrolyte additive according to the present invention, at least one of the Rs in the general formula (1) represents the secondary or tertiary branched alkoxy group substituted with fluorine. The secondary or tertiary branched alkoxy group substituted with fluorine is more preferably at least one selected from the group consisting of a hexafluoroisopropoxy group, a perfluoro-t-butoxy group, and a heptafluoroisobutoxy group. Among this group, the hexafluoroisopropoxy group is particularly preferable.

A non-aqueous electrolyte according to the present invention includes the above-described non-aqueous electrolyte additive and a supporting salt.

In the non-aqueous electrolyte according to the present invention, the content of the phosphazene compound represented by the general formula (1) is preferably in a range from at least 1% by volume to less than 15% by volume.

The non-aqueous electrolyte according to the present invention preferably further includes an aprotic organic solvent. Here, the aprotic organic solvent preferably includes a cyclic or chain ester compound.

A preferred example of the non-aqueous electrolyte according to the present invention includes $LiPF_6$ as the supporting salt, includes ethylene carbonate and/or propylene carbonate as the aprotic organic solvent, and includes the phosphazene compound in a range from at least 1% by volume to less than 15% by volume.

A preferred example of the non-aqueous electrolyte according to the present invention includes $LiBF_4$ as the supporting salt, includes propylene carbonate as the aprotic organic solvent, and includes the phosphazene compound in a range from at least 1% by volume to less than 15% by volume.

A non-aqueous electrolyte secondary battery according to the present invention includes the above-described non-aqueous electrolyte, a positive electrode, and a negative electrode.

Advantageous Effect of Invention

According to the present invention, it is possible to provide a non-aqueous electrolyte additive that includes a phosphazene compound with a molecular structure including a secondary or tertiary branched alkoxy group substituted with fluorine and that can improve the safety and battery characteristics of a non-aqueous electrolyte secondary battery. It is also possible to provide a non-aqueous electrolyte that includes the above additive, that is highly safe, and that can greatly improve the battery characteristics of a secondary battery. Furthermore, it is possible to provide a non-aqueous electrolyte secondary battery that includes the non-aqueous electrolyte and that has excellent safety and battery characteristics.

DESCRIPTION OF EMBODIMENTS

<Non-Aqueous Electrolyte Additive>

The following describes the non-aqueous electrolyte additive according to the present invention in detail. The non-aqueous electrolyte additive according to the present invention includes the phosphazene compound represented by the above general formula (1).

The aprotic organic solvent-based non-aqueous electrolytes conventionally used in a non-aqueous electrolyte secondary battery are a flammable liquid. When a large current rapidly flows, such as during a short circuit, and the battery generates an abnormal amount of heat, the electrolytes may evaporate or decompose to generate gas, and the generated gas may be ignited by a spark produced by the short circuit or the like, causing the battery to explode or ignite. Such electrolytes are thus highly dangerous. The addition of the non-aqueous electrolyte additive according to the present invention, which includes the above phosphazene compound, to these conventional non-aqueous electrolytes makes the non-aqueous electrolytes self-extinguishing, flame retardant, or incombustible due to action of nitrogen gas and fluorine gas derived from the phosphazene compound. Accordingly, the safety of the battery using the non-aqueous electrolyte that includes the additive according to the present invention is greatly improved. Furthermore, phosphorus contained in the above phosphazene compound acts to suppress chain-decomposition of high polymer materials that form a part of the battery, thereby increasing flame resistance (self-extinguishing property, flame retardancy, and incombustibility) even more effectively. Note that the aforementioned "safety" can be evaluated by the following safety evaluation method.

<<Safety Evaluation Method>>

Safety is evaluated according to a method that is a modification to the UL94HB method of the UL (Underwriting Laboratory) standards. The combustion behavior of flame (test flame: 800° C., for 30 seconds) that ignites in an atmospheric environment is measured. Specifically, on the basis of UL test standards, incombustible quartz fiber is saturated with 1.0 mL of electrolyte. Test pieces measuring 127 mm by 12.7 mm are prepared, and evaluation can be made by observing the ignitability (flame height and the like), combustibility, formation of carbide, phenomenon during secondary ignition, and the like of the test pieces.

In a conventional non-aqueous electrolyte secondary battery, it is considered that compounds generated due to decomposition or reaction of the solvent or the supporting salt in the non-aqueous electrolyte causes electrodes and peripheral materials of the electrodes to corrode. It is also considered that a reduction in the supporting salt itself further worsens the performance of the battery. For example, in ester-based electrolytes used as electrolytes in a non-aqueous electrolyte secondary battery, it is considered that corrosion progresses causing the battery to deteriorate due to $PF_5$ gas generated when a lithium ion source, such as an $LiPF_6$ salt that is a supporting salt, or the like decomposes over time into LiF and $PF_5$, or due to a hydrogen fluoride gas or the like that is generated when the $PF_5$ gas further reacts with water or the like. A phenomenon thus occurs in which not only does conductivity of the non-aqueous electrolyte deteriorate, but the electrode materials also deteriorate due to the generation of the hydrogen fluoride gas. On the other hand, the above phosphazene compound contributes to suppressing decomposition of the solvent or supporting salt, for example a lithium ion source such as $LiPF_6$, and promotes stabilization (being particularly effective for $PF_6$). Accordingly, the addition of the phosphazene compound to a conventional non-aqueous electrolyte suppresses the decomposition reaction of the non-aqueous electrolyte, thus allowing for prevention of corrosion and deterioration.

The above phosphazene compound is represented by the above general formula (1), wherein each R independently represents fluorine or a secondary or tertiary branched alkoxy group substituted with fluorine, at least one of the Rs represents the secondary or tertiary branched alkoxy group substituted with fluorine, and n is from 3 to 14. The reason why the phosphazene compound used in the present invention is represented by the above general formula (1) is as follows.

Including a phosphazene compound can provide a non-aqueous electrolyte with an excellent self-extinguishing property or flame retardancy, and furthermore, if at least one of the Rs represented by the above general formula (1) is a secondary or tertiary branched alkoxy group substituted with fluorine, the non-aqueous electrolyte can be provided with excellent incombustibility. Moreover, if at least one of the Rs is fluorine, the non-aqueous electrolyte can be provided with even better incombustibility. Here, "incombustibility" refers to a characteristic whereby, in the above "Safety Evaluation Method", a non-aqueous electrolyte does not ignite whatsoever even when a test flame is applied thereto, i.e. a characteristic whereby the test flame does not ignite the test piece (flame height: 0 mm). Furthermore, "self-extinguishing" refers to a characteristic whereby, in the above "Safety Evaluation Method", a lit flame extinguishes at a 25 mm to 100 mm line and a state is entered in which no ignition of falling material is observed. "Flame retardant" refers to a characteristic whereby, in the above "Safety Evaluation Method", a lit flame does not reach a 25 mm line and a state is entered in which no ignition of falling material is observed.

The secondary or tertiary branched alkoxy group substituted with fluorine in the above general formula (1) refers to a portion of hydrogen elements in a secondary or tertiary branched alkoxy group being substituted with a fluorine element.

Examples of the secondary or tertiary branched alkoxy group substituted with fluorine include a hexafluoroisopropoxy group, a heptafluoroisopropoxy group, a heptafluoroisobutoxy group, an octafluoro-s-butoxy group, a perfluoro-t-butoxy group, a nonafluoroisobutoxy group, and the like. Among these, the hexafluoroisopropoxy group, perfluoro-t-butoxy group, and heptafluoroisobutoxy group are preferable.

The value of n in the above general formula (1) is from 3 to 14, with 3 or 4 being preferable, and 3 being particularly preferable.

Note that in a compound having a substituent that includes fluorine, the occurrence of fluorine radicals may become a problem, but no such problem occurs in the above phosphazene compound, since the phosphorus elements in the molecular structure capture fluorine radicals to form stable phosphorus fluoride.

Appropriately selecting the values for R and n in the above general formula (1) allows for synthesis of a non-aqueous electrolyte having even better properties such as incombustibility, viscosity, and solubility appropriate for the mixture. One type of the above phosphazene compound may be used singly, or two or more types may be used in combination.

The flash point of the above phosphazene compound is not particularly limited, yet from the perspective of suppressing ignition and the like, the flash point is preferably at least 100° C. and more preferably at least 150° C. If the phosphazene compound has a flash point of at least 100° C., ignition or the like is suppressed, and even if ignition or the like occurs within the battery, it is possible to reduce the risk of the flame catching and spreading across the electrolyte surface. Note that the flash point specifically refers to a temperature at which flame spreads over the surface of a substance and covers at least 75% thereof. The flash point is a criterion for observing the tendency to form a mixture combustible with air. In the context of the present invention, the flash point is measured by the mini-flash method below. Namely, an apparatus (an automatic flash point tester, MINIFLASH manufactured by GRABNER INSTRUMENTS) is first prepared. The apparatus adopts a closed cup method and is provided with a small 4 mL measuring chamber, a heating cup, a flame, an ignition portion and an automatic flame sensing system. A 1 mL sample to be measured is then placed into the heating cup and covered, and the heating cup is heated from the upper portion of the cover. Subsequently, the sample temperature is raised at constant intervals, a mixture of vapor and air in the cup is ignited at constant temperature intervals, and ignition is detected. The flash point is considered to be the temperature when ignition is detected.

<Non-Aqueous Electrolyte>

Next, the non-aqueous electrolyte according to the present invention is described in detail. The non-aqueous electrolyte according to the present invention includes the above-described non-aqueous electrolyte additive and a supporting salt. As necessary, an aprotic organic solvent or the like may be further included.

As the supporting salt used in the non-aqueous electrolyte according to the present invention, a supporting salt that becomes an ion source for lithium ions is preferable. The supporting salt is not particularly limited. Suitable examples include lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$, and the like. One type of these supporting salts may be used singly, or two or more types may be used in combination.

The concentration of the supporting salt in the non-aqueous electrolyte according to the present invention is preferably from 0.5 mol/L to 1.5 mol/L and more preferably from 0.8 mol/L to 1 mol/L. If the concentration of the supporting salt is less than 0.5 mol/L, then the conductivity of the electrolyte cannot be sufficiently guaranteed, which may inhibit the charge-discharge characteristics of the battery. On the other hand, at a concentration exceeding 1.5 mol/L, the viscosity of the electrolyte increases, making it impossible to guarantee sufficient mobility of lithium ions. As described above, the conductivity of the electrolyte therefore cannot be sufficiently guaranteed, which may inhibit the charge-discharge characteristics of the battery.

The viscosity of the non-aqueous electrolyte according to the present invention at 25° C. is preferably 10 mPa·s (10 cP) or less, and more preferably 5 mPa·s (5 cP) or less. If the viscosity of the non-aqueous electrolyte is 10 mPa·s (10 cP) or less, a non-aqueous electrolyte secondary battery with excellent battery characteristics, such as low internal resistance and high conductivity, can be produced. Note that viscosity is calculated by performing measurement with a viscometer (R-type viscometer Model RE500-SL, manufactured by Toki Sangyo Co., Ltd.) for 120 seconds at a time at rotational speeds of 1 rpm, 2 rpm, 3 rpm, 5 rpm, 7 rpm, 10 rpm, 20 rpm, and 50 rpm. The rotational speed at which the value indicated by the viscometer is from 50% to 60% serves as an analysis condition, and the viscosity is calculated by measuring the value at this point.

From the perspective of lowering viscosity and improving electrical conductivity, the non-aqueous electrolyte according to the present invention preferably further includes an aprotic organic solvent. Including an aprotic organic solvent in the non-aqueous electrolyte easily lowers viscosity and improves the electrical conductivity of the non-aqueous electrolyte. The aprotic organic solvent is not particularly limited, but in terms of lowering viscosity of the non-aqueous electrolyte, an ether compound or an ester compound is preferable. Suitable examples include 1,2-dimethoxyethane, tetrahydrofuran, dimethyl carbonate, diethyl carbonate, ethyl methyl carbonate, ethylene carbonate, propylene carbonate, γ-butyrolactone, γ-valerolactone, and diphenyl carbonate. Among these, cyclic ester compounds such as ethylene carbonate, propylene carbonate, and γ-butyrolactone; chain ester compounds such as dimethyl carbonate, ethyl methyl carbonate, and diethyl carbonate; and chain ether compounds such as 1,2-dimethoxyethane are preferable. In particular, the cyclic ester compounds are preferable in that they have a high relative dielectric constant and excellent solubility in supporting salts or the like, and the chain ester compounds are preferable in that they have low viscosity and can thus lower the viscosity of the non-aqueous electrolyte. One type of these aprotic organic solvents may be used singly, but combined use of two or more types is preferable. The viscosity of the aprotic organic solvent at 25° C. is preferably 10 mPa·s (10 cP) or less, and more preferably 5 mPa·s (5 cP) or less, since such values allow for the viscosity of the non-aqueous electrolyte to be lowered easily.

From the perspective of safety and battery characteristics, the content of the phosphazene compound represented by the above general formula (1) in the non-aqueous electrolyte according to the present invention is preferably in a range from at least 1% by volume to less than 15% by volume.

Furthermore, from the perspective of increasing flame resistance (self-extinguishing property, flame retardancy, and incombustibility) of the non-aqueous electrolyte according to the present invention, the content of the phosphazene compound represented by the above general formula (1) in the non-aqueous electrolyte is preferably at least 1% by volume, more preferably at least 3% by volume, and even more preferably at least 5% by volume. If the content of the phosphazene compound is less than 1% by volume, the flame resistance of the electrolyte may not be sufficiently increased.

Note that from the perspective of increasing flame resistance, the non-aqueous electrolyte according to the present invention in particular preferably includes the above phosphazene compound, $LiPF_6$, and ethylene carbonate and/or propylene carbonate. It is also preferable in particular that the non-aqueous electrolyte include the above phosphazene compound, $LiBF_4$, and propylene carbonate. In these cases, even if the content of the above phosphazene compound in the non-aqueous electrolyte is low, an excellent increase in flame resistance can be achieved.

Furthermore, from the perspective of resistance to deterioration of the non-aqueous electrolyte according to the present invention, the content of the phosphazene compound represented by the above general formula (1) in the non-aqueous electrolyte is preferably at least 1% by volume, and more preferably from at least 1% by volume to less than 15% by volume. If the content of the phosphazene compound is at least 1% by volume, deterioration of the electrolyte can be suppressed effectively.

Furthermore, from the perspective of making resistance to deterioration compatible with safety, the content of the phosphazene compound represented by the above general formula (1) in the non-aqueous electrolyte is preferably in a range from at least 1% by volume to less than 15% by volume, more preferably in a range from at least 3% by volume to less than 15% by volume, and even more preferably in a range from at least 5% by volume to less than 15% by volume. "Deterioration" refers to decomposition of the above supporting salt (such as lithium salt), and the effect of preventing deterioration is evaluated by the following stability evaluation method.

<<Stability Evaluation Method>>

(1) First, a non-aqueous electrolyte containing a supporting salt is prepared, and the moisture content is measured. Once a moisture content of 20 ppm or less is confirmed, the color of the non-aqueous electrolyte is then confirmed visually.

(2) Subsequently, the same non-aqueous electrolyte as above is kept in a constant temperature bath in a glove box for 10 days at 60° C. Once again, the moisture content is then measured and color is observed, and stability is evaluated based on the changes in these characteristics.

While the basic structure of the electrolyte for a non-aqueous electrolyte battery according to the present invention has been described, other typically used additives may be added to the electrolyte for a non-aqueous electrolyte battery according to the present invention at any ratio so long as the subject matter of the invention is not adversely affected. Specific examples include compounds having an overcharge prevention effect, a negative electrode film formation effect, and a positive electrode protection effect, such as cyclohexylbenzene, biphenyl, t-butylbenzene, vinylene carbonate, vinyl ethylene carbonate, difluoroanisole, fluoroethylene carbonate, propane sultone, dimethylvinylene carbonate, and the like. Furthermore, as in the case of use in a non-aqueous electrolyte battery referred to as a lithium polymer battery, the electrolyte for a non-aqueous electrolyte battery can be used after being solidified with a gelling agent or a cross-linked polymer.

<Non-Aqueous Electrolyte Secondary Battery>

Next, the non-aqueous electrolyte secondary battery according to the present invention is described in detail. The non-aqueous electrolyte secondary battery according to the present invention includes the above-described non-aqueous electrolyte, a positive electrode, and a negative electrode, and as necessary, other members typically used in the technical area of non-aqueous electrolyte secondary batteries, such as a separator.

The positive electrode active material used in the positive electrode of the non-aqueous electrolyte secondary battery according to the present invention is not particularly limited and can be appropriately selected from among known materials. Suitable examples include metal oxides such as $V_2O_5$, $V_6O_{13}$, $MnO_2$, and $MnO_3$; lithium-containing composite oxides such as $LiCoO_2$, $LiNiO_2$, $LiMn_2O_4$, $LiFeO_2$, and $LiFePO_4$; metal sulfides such as $TiS_2$ and $MoS_2$; and conductive polymers such as polyaniline. The above lithium-containing composite oxides may be a composite oxide including two or three transition metals selected from the group consisting of Fe, Mn, Co, and Ni. In this case, the composite oxide is represented by $LiFe_xCo_yNi_{(1-x-y)}O_2$ (in the formula, $0 \le x<1$, $0 \le y<1$, and $0<x+y \le 1$), $LiMn_xFe_yO_{2-x-y}$, or the like. Among these, $LiCoO_2$, $LiNiO_2$ and $LiMn_2O_4$ are particularly suitable because they are high capacity and are safe, and furthermore have excellent electrolyte wettability. These positive electrode active materials may be used singly, or two or more types may be used in combination.

The negative electrode active material used in the negative electrode of the non-aqueous electrolyte secondary battery according to the present invention is not particularly limited as long as it can absorb and discharge lithium, lithium ions, or the like and can be appropriately selected from among known materials. Suitable examples include lithium metal itself; alloys and intermetallic compounds of lithium and Al, Si, Sn, In, Pb, Zn, and the like; and a carbon material such as lithium-doped graphite. Among these materials, a carbon material such as graphite is preferable for its higher safety and its excellent electrolyte wettability, with graphite being particularly preferable. Examples of graphite include natural graphite, artificial graphite, Mesophase Carbon Micro Beads (MCMB), and the like, and generally graphitizable carbon and non-graphitizable carbon. These negative electrode active materials may be used singly, or two or more types may be used in combination.

A conducting agent and a binding agent may be mixed as necessary into the positive electrode and the negative electrode. Examples of the conducting agent include acetylene black, and examples of the binding agent include polyvinylidene difluoride (PVDF), polytetrafluoroethylene (PTFE), styrene-butadiene rubber (SBR), and carboxymethyl cellulose (CMC). These additives can be used in a blend ratio similar to conventional blend ratios.

The shape of the positive and negative electrodes is not particularly limited and can be appropriately selected from among known electrode shapes. Examples include a sheet, a cylinder, a plate, a spiral, or other such shape.

An example of another material used in the non-aqueous electrolyte secondary battery according to the present invention is a separator that is interposed between the negative and positive electrodes in the non-aqueous electrolyte secondary battery in order to prevent a short circuit due to contact between the electrodes. The material for the separator may be a material that can reliably prevent contact between the electrodes and that can contain electrolyte or allow electrolyte to flow through. Examples include non-woven fabrics, thin film layers, and the like of synthetic resins such as polytetrafluoroethylene, polypropylene, polyethylene, cellulose-based resins, polybutylene terephthalate, polyethylene terephthalate, and the like. Among these, a microporous film of polypropylene or polyethylene that is approximately 20 μm to 50 μm thick, or a film of a cellulose-based resin, polybutylene terephthalate, polyethylene terephthalate, or the like is particularly preferable. Apart from the above-described separator, any well-known members regularly used in a battery can be used suitably with the present invention.

When the positive electrode is $LiCoO_2$, the capacity of the non-aqueous electrolyte secondary battery according to the present invention is, in terms of charge-discharge capacity (mAh/g), preferably in a range from 140 mAh/g to 145 mAh/g, and more preferably in a range from 143 mAh/g to 145 mAh/g. The charge-discharge capacity can be measured with a well-known measurement method, such as a method to perform a charge-discharge test using a semi-open type battery or a closed type coin battery and to calculate the capacity based on the charging current (mA), time (t) and electrode material weight (g).

The form of the non-aqueous electrolyte secondary battery according to the present invention is not particularly limited. A variety of well-known configurations provide suitable examples, such as a coin-type battery, a button-type battery, a paper-type battery, a square-type battery, and a cylindrical battery having a spiral structure. In the case of a button-type battery, the non-aqueous electrolyte secondary battery can be produced by, for example, producing the positive and negative electrodes in the form of sheets and providing a separator therebetween. In the case of a spiral structure, the non-aqueous electrolyte secondary battery can be produced by, for example, producing the positive electrode in the form of a sheet, layering a collector thereon, overlaying a negative electrode in the form of a sheet, and rolling these members up.

From the perspective of improving battery characteristics, such as the charge-discharge cycle performance, low-temperature characteristics, and the like in the non-aqueous electrolyte secondary battery according to the present invention, the content of the phosphazene compound represented by the above general formula (1) in the non-aqueous electrolyte is preferably in a range from at least 1% by volume to less than 15% by volume, more preferably in a range from at least 3% by volume to less than 15% by volume, and even more preferably in a range from at least 5% by volume to less than 15% by volume. Note that the "charge-discharge cycle performance" and the "low-temperature characteristics" can be evaluated by the evaluation method described below.

EXAMPLES

The following describes the present invention in further detail by providing examples, yet the present invention is in no way limited to the following examples.

Example 1

Preparation of Non-Aqueous Electrolyte

A non-aqueous electrolyte was prepared by adding 1 mL (1% by volume) of a phosphazene compound (a cyclic phosphazene compound represented by the above general formula (1) in which n is 3, five Rs are fluorine, and one R is a hexafluoroisopropoxy group; flash point: none) (non-aqueous electrolyte additive) to 99 mL of a mixed solvent of ethylene carbonate, dimethyl carbonate, and ethyl methyl carbonate (mixture ratio (volume ratio) of ethylene carbonate/dimethyl carbonate/ethyl methyl carbonate=1/1/1) (aprotic organic solvent) and further dissolving $LiPF_6$ (supporting salt) therein at a concentration of 0.95 mol/L. The safety and resistance to deterioration of the resulting non-aqueous electrolyte were measured and evaluated with the following method. Table 1 lists the results.

<Evaluation of Safety>

Safety was evaluated according to a method that is a modification to the UL94HB method of the UL (Underwriting Laboratory) standards. The combustion behavior of flame (test flame: 800° C.) that ignites in an atmospheric environment was measured. Specifically, on the basis of UL test standards, incombustible quartz fiber was saturated with 1.0 mL of each electrolyte. Test pieces measuring 127 mm by 12.7 mm were prepared, and evaluation was made by observing the ignitability (flame height and the like), combustibility, formation of carbide, phenomenon during secondary ignition, and the like of the test pieces. When the non-aqueous electrolyte did not ignite whatsoever even when the test flame was applied thereto (flame height: 0 mm), an evaluation of "incombustible" was made. When the flame did not reach the 25 mm line of the device, and no ignition of falling material from the test piece was observed, an evaluation of "flame retardant" was made. When the flame extinguished at the 25 mm to 100 mm line of the device, and no ignition of falling material from the test piece was observed, an evaluation of "self-extinguishing" was made. When the flame exceeded the 100 mm line, an evaluation of "combustible" was made.

<Evaluation of Resistance to Deterioration>

Deterioration of the resulting non-aqueous electrolyte was evaluated by measuring the moisture content (ppm) immediately after preparation and after keeping the non-aqueous electrolyte in a constant temperature bath (60° C.) in a glove box for 10 days, and by observing the change in color after keeping the non-aqueous electrolyte in the glove box.

[Production of Non-Aqueous Electrolyte Secondary Battery]

Batteries were produced using $LiCoO_2$ as the positive electrode material and graphite as the negative electrode material, and a charge-discharge test was actually performed on the batteries. The test batteries were produced as follows.

Into 90 parts by mass of $LiCoO_2$ powder, 5 parts by mass of polyvinylidene difluoride (PVDF) as a binder and 5 parts by mass of acetylene black as a conducting material were mixed. N-methylpyrrolidone was then added, and the result was formed into a paste. The paste was applied to aluminum foil and dried to yield a test positive electrode body. Into 90 parts by mass of graphite powder, 10 parts by mass of polyvinylidene difluoride (PVDF) as a binder were mixed. N-methylpyrrolidone was then added, and the result was slurried. The slurry was applied to copper foil and dried for 12 hours at 150° C. to yield a test negative electrode body. Electrolyte was infused into a polyethylene separator, and a 50 mAh battery with an aluminum laminated exterior was assembled.

For each resulting battery, the charge-discharge cycle performance and the low-temperature characteristics were measured and evaluated using the following evaluation method. Table 1 lists the results.

<Evaluation of Charge-Discharge Cycle Performance>

At 60° C., under the conditions of an upper limit voltage of 4.2 V, lower limit voltage of 3.0 V, discharge current of 50 mA, and charge current of 50 mA, charging and discharging were repeated for 500 cycles. The discharge capacity at this point was compared to the initial discharge capacity to calculate the capacity retention rate after 500 cycles. Measurements and calculations were similarly made for a total of three batteries and the average was calculated to evaluate the charge-discharge cycle performance.

<Evaluation of Low-Temperature Characteristics>

For the obtained batteries, charging and discharging were repeated for 50 cycles with the temperature during discharge set to a low temperature (−10° C., −20° C.) and other conditions being the same as in the above "Evaluation of Charge-Discharge Cycle Performance". The discharge capacity at this point at the low temperature was compared to the discharge capacity measured at 20° C. to calculate the discharge capacity survival rate with formula (2) below. Measurements and calculations were similarly made for a total of three batteries and the average was calculated to evaluate the low-temperature characteristics.

Discharge capacity survival rate=low temperature discharge capacity/discharge capacity (20° C.)×100 (%)    (2)

Example 2

A non-aqueous electrolyte was prepared in the same way as in the "Preparation of Non-Aqueous Electrolyte" of Example 1, except that the mixed solvent of ethylene carbonate, dimethyl carbonate, and ethyl methyl carbonate was 97 mL, and the phosphazene compound was 3 mL (3% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Example 3

A non-aqueous electrolyte was prepared in the same way as in the "Preparation of Non-Aqueous Electrolyte" of Example 1, except that the mixed solvent of ethylene carbonate, dimethyl carbonate, and ethyl methyl carbonate was 95 mL, and the phosphazene compound was 5 mL (5% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Example 4

A non-aqueous electrolyte was prepared in the same way as in the "Preparation of Non-Aqueous Electrolyte" of Example 1, except that the mixed solvent of ethylene carbonate, dimethyl carbonate, and ethyl methyl carbonate was 90 mL, and the phosphazene compound was 10 mL (10% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Example 5

A non-aqueous electrolyte was prepared in the same way as in the "Preparation of Non-Aqueous Electrolyte" of Example 1, except that the mixed solvent of ethylene carbonate, dimethyl carbonate, and ethyl methyl carbonate was 86 mL, and the phosphazene compound was 14 mL (14% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Example 6

A non-aqueous electrolyte was prepared in the same way as in the "Preparation of Non-Aqueous Electrolyte" of Example 1, except that the mixed solvent of ethylene carbonate, dimethyl carbonate, and ethyl methyl carbonate was 86 mL, the phosphazene compound was 14 mL (14% by volume), and $LiBF_4$ (supporting salt) was used instead of $LiPF_6$ (supporting salt). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Comparative Example 1

A non-aqueous electrolyte was prepared in the same way as in the "Preparation of Non-Aqueous Electrolyte" of Example 1, except that no phosphazene compound was added. The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Comparative Example 2

A non-aqueous electrolyte was prepared in the same way as in the "Preparation of Non-Aqueous Electrolyte" of Example 1, except that the phosphazene compound was replaced by a cyclic phosphazene compound represented by the above general formula (1) in which n is 3, five Rs are fluorine, and one R is an ethoxy group (flash point: none), the mixed solvent of ethylene carbonate, dimethyl carbonate, and ethyl methyl carbonate was 99 mL, and the phosphazene compound was 1 mL (1% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

Comparative Example 3

A non-aqueous electrolyte was prepared in the same way as in the "Preparation of Non-Aqueous Electrolyte" of Comparative Example 2, except that the mixed solvent of ethylene carbonate, dimethyl carbonate, and ethyl methyl carbonate was 90 mL, and the phosphazene compound was 10 mL (10% by volume). The safety and resistance to deterioration were then evaluated. Non-aqueous electrolyte secondary batteries were produced in the same way as in Comparative Example 2, and the charge-discharge cycle performance and low-temperature characteristics were measured and evaluated. Table 1 lists the results.

Comparative Example 4

A non-aqueous electrolyte was prepared in the same way as in the "Preparation of Non-Aqueous Electrolyte" of Comparative Example 2, except that the mixed solvent of ethylene carbonate, dimethyl carbonate, and ethyl methyl carbonate was 85 mL, and the phosphazene compound was 15 mL (15% by volume). The safety and resistance to deterioration were then evaluated. As in Comparative Example 2, non-aqueous electrolyte secondary batteries were produced, and the charge-discharge cycle performance and low-temperature characteristics were measured and evaluated. Table 1 lists the results.

Comparative Example 5

A non-aqueous electrolyte was prepared in the same way as in the "Preparation of Non-Aqueous Electrolyte" of Example 1, except that the phosphazene compound was replaced by a cyclic phosphazene compound represented by the above general formula (1) in which n is 3, five Rs are fluorine, and one R is a trifluoroethoxy group (flash point: none), the mixed solvent of ethylene carbonate, dimethyl carbonate, and ethyl methyl carbonate was 90 mL, and the phosphazene compound was 10 mL (10% by volume). The safety and resistance to deterioration were then evaluated. Non-aqueous electrolyte secondary batteries were produced in the same way as Example 1, and the charge-discharge cycle performance and low-temperature characteristics were measured and evaluated. Table 1 lists the results.

The results in Table 1 show that adding the non-aqueous electrolyte additive according to the present invention to the non-aqueous electrolyte of a non-aqueous electrolyte secondary battery improves safety and battery characteristics as compared to a conventional non-aqueous electrolyte secondary battery.

The invention claimed is:

1. A non-aqueous electrolyte comprising a non-aqueous electrolyte additive and a supporting salt, wherein the non-aqueous electrolyte additive comprises a phosphazene compound represented by the following general formula (1):

$$(NPR_2)_n \quad (1)$$

wherein each R independently represents fluorine or a hexafluoroisopropoxy group, one of the Rs represents the hexafluoroisopropoxy group, and n is from 3 to 14, wherein a content of the phosphazene compound represented by the general formula (1) is in a range from at least 1% by volume to less than 15% by volume.

2. The non-aqueous electrolyte according to claim 1, further comprising an aprotic organic solvent.

3. The non-aqueous electrolyte according to claim 2, wherein the aprotic organic solvent includes a cyclic or chain ester compound.

4. The non-aqueous electrolyte according to claim 3, including $LiPF_6$ as the supporting salt, and including ethylene carbonate and/or propylene carbonate as the aprotic organic solvent.

TABLE 1

| | Content of phosphazene compound volume % | Safety of electrolyte | Resistance to deterioration of electrolyte | | | Cycle performance Capacity retention rate after 60° C. | Low-temperature characteristics Discharge capacity survival rate | |
| | | | Immediately after preparation | After being kept at 60° C. | | | | |
| | | | moisture ppm | moisture ppm | color | cycle % | −10° C. % | −20° C. % |
| Example 1 | 1 | self-extinguishing | <20 | <20 | clear and light yellow | 58 | 40 | 19 |
| Example 2 | 3 | flame retardant | <20 | <20 | clear and colorless | 61 | 40 | 17 |
| Example 3 | 5 | incombustible | <20 | <20 | clear and colorless | 60 | 43 | 16 |
| Example 4 | 10 | incombustible | <20 | <20 | clear and colorless | 59 | 41 | 17 |
| Example 5 | 14 | incombustible | <20 | <20 | clear and colorless | 61 | 45 | 19 |
| Example 6 | 14 | incombustible | <20 | <20 | clear and colorless | 62 | 43 | 18 |
| Comparative Example 1 | 0 | combustible | <20 | 60 | cloudy brown | 43 | 22 | 7 |
| Comparative Example 2 | 1 | combustible | <20 | <20 | clear and light yellow | 42 | 23 | 1 |
| Comparative Example 3 | 10 | incombustible | <20 | <20 | clear and colorless | 43 | 8 | 0 |
| Comparative Example 4 | 15 | incombustible | <20 | <20 | clear and colorless | Battery evaluation impossible due to bilayer separation of electrolyte | | |
| Comparative Example 5 | 10 | incombustible | <20 | <20 | clear and colorless | 52 | 14 | 3 |

5. The non-aqueous electrolyte according to claim 3, including $LiBF_4$ as the supporting salt, and including propylene carbonate as the aprotic organic solvent.

6. A non-aqueous electrolyte secondary battery comprising the non-aqueous electrolyte according to claim 1, a positive electrode, and a negative electrode.

* * * * *